April 1, 1941. M. FEDAK 2,236,678
HOBBYHORSE
Filed May 22, 1939
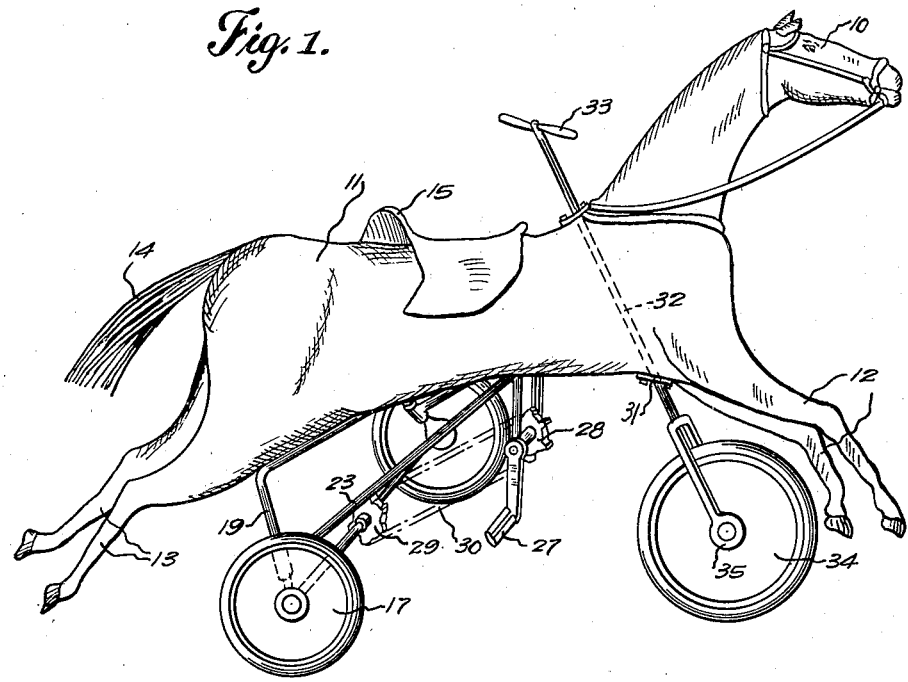
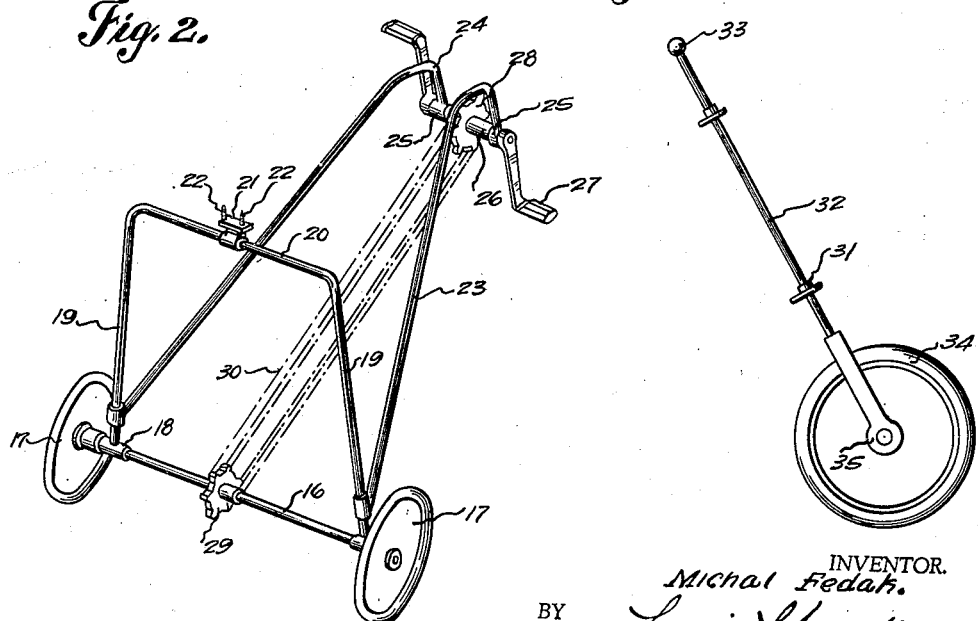
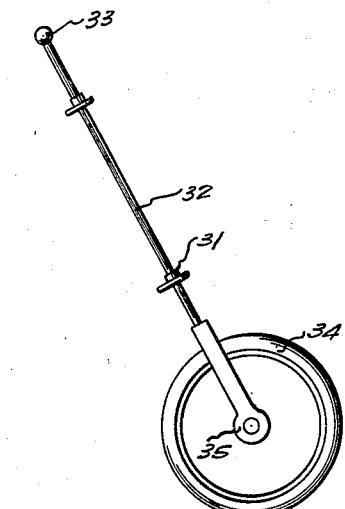
INVENTOR.
Michal Fedak.
BY Louis Chayka
ATTORNEY.

Patented Apr. 1, 1941

2,236,678

UNITED STATES PATENT OFFICE 2,236,678

HOBBYHORSE

Michael Fedak, Hamtramck, Mich.

Application May 22, 1939, Serial No. 274,979

1 Claim. (Cl. 280—1.13)

The purpose of the invention was to combine the form of a horse with means of locomotion, so that a child using said horse might be able to propel said horse from one place to another. A further purpose was to provide a hobbyhorse of simple and sturdy construction, requiring little power to effect the above said locomotion. In this respect, I wish to say that hobbyhorses have been known in many forms but that this combination of having a hobbyhorse mounted on a cycle and provided with means of locomotion, specifically pedals to be operated by the child seated on a horse is, in the form presented by me, novel and within its sphere of purpose useful.

I shall now describe my improvement with reference to the accompanying drawing, in which:

Fig. 1 shows a perspective view of my hobbyhorse as mounted on a tricycle.

Fig. 2 shows a perspective view of the vehicular framework on which the hobbyhorse is mounted.

Fig. 3 shows a side view of the steering rod being a part of the hobbyhorse assembly.

Similar numerals refer to similar parts throughout the several views.

The hobbyhorse of my construction comprises a vehicular framework shown in Fig. 2, a steering rod shown in Fig. 3, and a body simulating the body of a horse as shown in Fig. 1. The frame and the steering rod are made preferably of metal, which may be tubular or in the form of rods, while the body mounted thereon may be made of wood or some other suitable material.

The body of the horse itself comprises a head 10, a trunk 11, front legs 12, rear legs 13, and a tail 14. The saddle, which may be made as a separate part of some suitable material like leather or cloth, is indicated by numeral 15. It will be understood that the figure of the horse may be substituted by the figure of some other animal or a body of some other shape.

The body of the horse is mounted partly on the framework, which is shown in Fig. 2, and partly on the steering rod shown in Fig. 3. Said framework comprises a horizontally disposed axle 16, equipped with a vehicular wheel at each end thereof. Resting on short sleeves 18, which serve as bearings for axle 16, an inverted U-shaped brace 19 rises upward, its upper section 20 extending in parallel with the axle and providing a support for the body of the horse. A bracket 21 provided with screws 22 for attachment to the body of the horse, is mounted on section 20 approximately in the middle thereof.

Extending from the lower part of the U-shaped member, on each side thereof, are rods or tubes 23. Each of said rods has the shape of an inverted letter V, with one of its arms being considerably shorter than the other. The shorter arms 24 terminate in bearings 25 supporting a short axle 26, which is rotatably held within said bearings. At each end the axle is joined to a pedal 27 in such a manner that a rotary motion may be imparted to the axle by means of these pedals. A sprocket 28 is seated on and keyed to the front axle, while a similar sprocket 29 is seated upon the rear axle 16 and keyed thereto. A chain 30, threaded upon said sprockets, connects both axles. It is upon this frame described above that the rear part of the body of the horse is mounted in a fixed position. The front part of the body of said horse rests upon bracket 31 mounted on a rod 32. The rod, which is in a pivotal connection with the body of the horse, terminates at its upper end in handle 33, while at its lower end said rod is bifurcated so as to straddle wheel 34. The axle of said wheel is journalled in the bifurcated ends 35 of said rod.

The operation of the hobbyhorse is quite obvious. The horse may be propelled by actuating the pedals mounted on the axle of the front wheel, by foot work of the child seated on the horse, while the handle affixed to the top of the steering rod serves to impart a desired direction to the movement of the hobbyhorse.

What I claim as my invention is as follows:

A movable toy comprising a body representing a quadruped and provided with a saddle, independent front and rear frames secured to the underside of said body, an axle journalled in said rear frame, a pair of wheels fixed on the ends of the axle, a shaft rotatable in said frame below the saddle, pedals on said shaft accessible by the feet of a rider, chain driving connections between said shaft and axle, said elements constituting a unit separable from said body, a steering post disposed at an angle in said front frame and passing rotatably through the front part of said body, steering handles on said post convenient to rider, a fork at the lower end of said post, and a wheel pivoted in said fork.

MICHAEL FEDAK.